A. W. FINLAYSON.
MOLD FOR PNEUMATIC TIRE CASINGS.
APPLICATION FILED JULY 21, 1913.

1,132,250.

Patented Mar. 16, 1915.
2 SHEETS—SHEET 1.

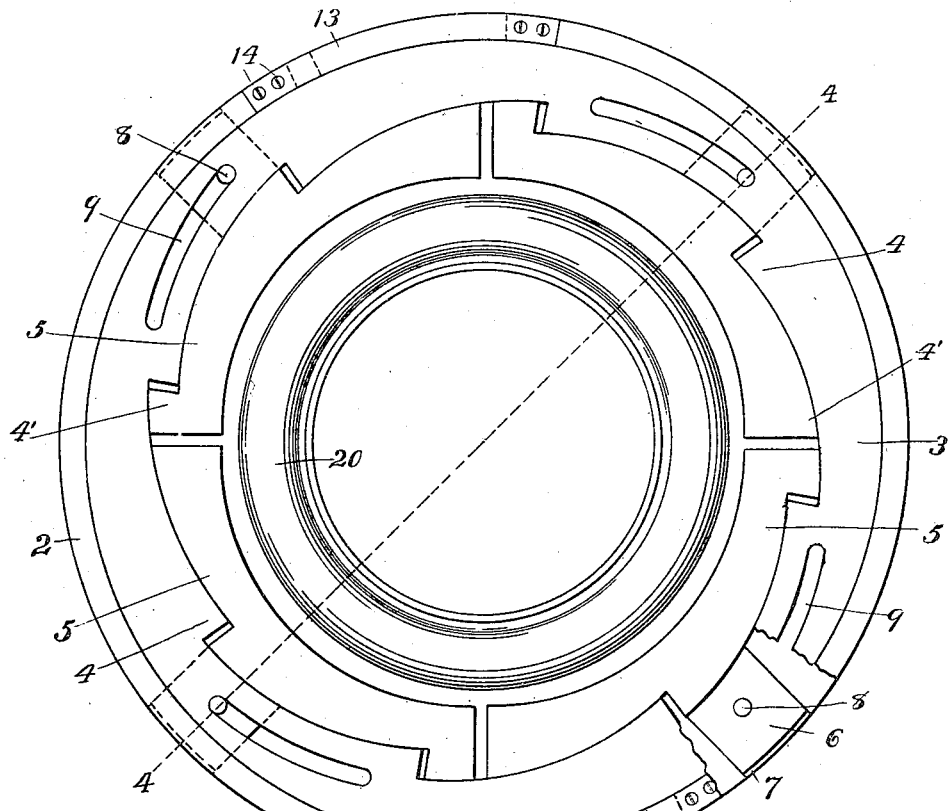
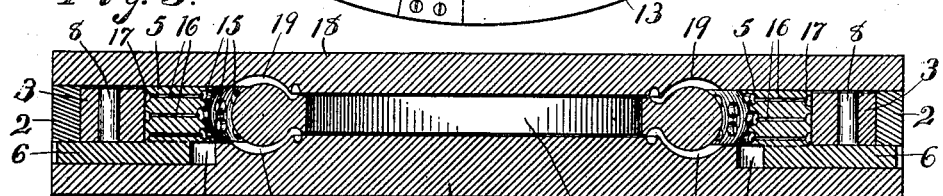
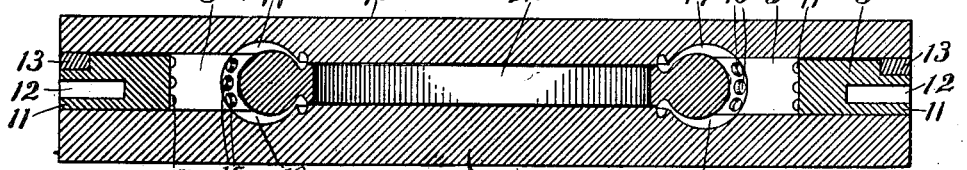

UNITED STATES PATENT OFFICE.

ALEXANDER W. FINLAYSON, OF DETROIT, MICHIGAN, ASSIGNOR TO F. S. STOEPEL AND CLAUD D. DOYLE, TRUSTEES.

MOLD FOR PNEUMATIC-TIRE CASINGS.

1,132,250.  Specification of Letters Patent.  Patented Mar. 16, 1915.

Application filed July 21, 1913. Serial No. 780,123.

*To all whom it may concern:*

Be it known that I, ALEXANDER W. FINLAYSON, a citizen of the United States, residing at Detroit, in the county of Wayne, State of Michigan, have invented certain new and useful Improvements in Molds for Pneumatic-Tire Casings; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in molds for pneumatic tire casings, and relates particularly to a mold for forming and curing the tread of the casing wherein the wearing surface is provided with raised projections to assist in gaining traction and to prevent slipping and skidding, commonly known as non-skidding treads.

The object of the invention is to provide means to facilitate the forming and curing of the non-skidding surfaces of pneumatic tire casings, in which this portion of the casing may be formed and cured together with the body of the casing in a single operation or treatment.

Heretofore it has been the common practice to form and cure the body of the casing and to then form and apply the raised tread surface, requiring a second treatment for the curing of this portion of the tire, this being necessary owing to the difficulty in releasing the casing from the mold because of the locking tendency of the projecting surface of the tread. It has therefore been necessary to treat the casing by binding the raised tread portion thereto with strips of cloth to hold the tread surface in contact with the casing when subjected to the heat treatment for the final curing. The mold herein described is calculated to dispense with this second operation and to provide for the complete curing of the casing within the mold in a single operation.

The above object is attained by the construction illustrated in the accompanying drawings, in which:—

Figure 1:
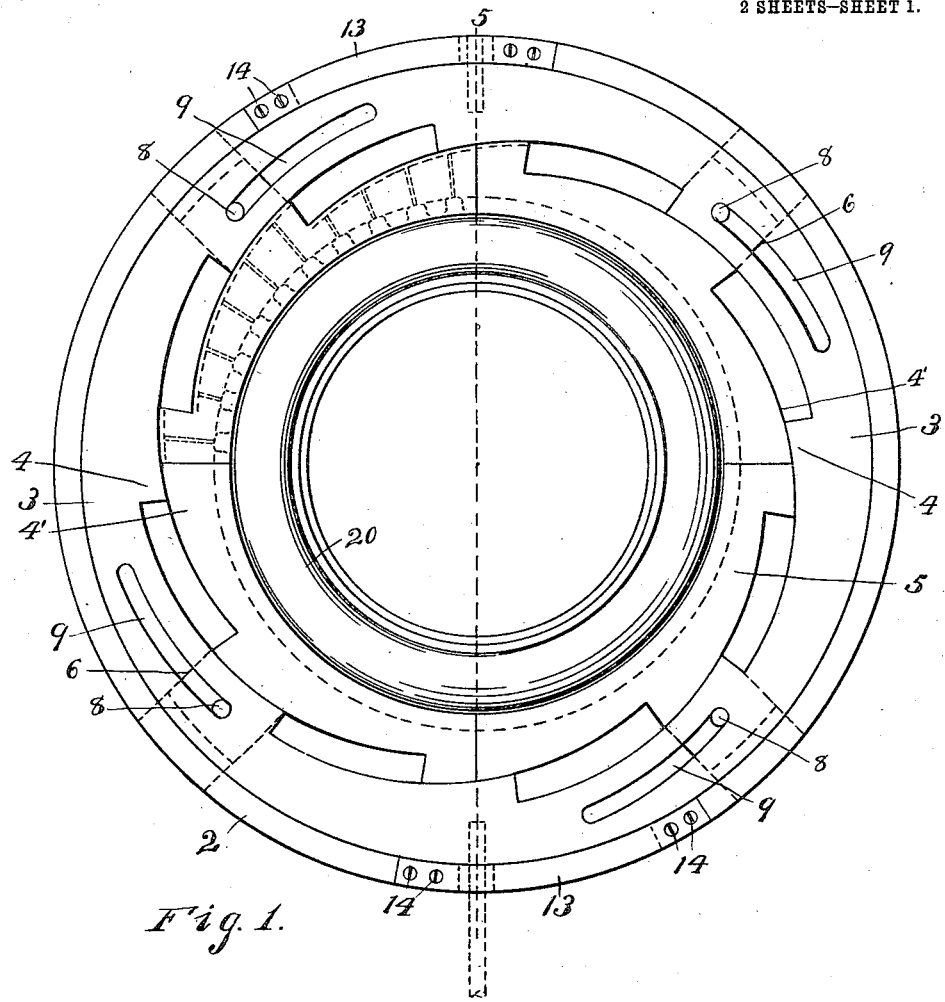
Figure 2:
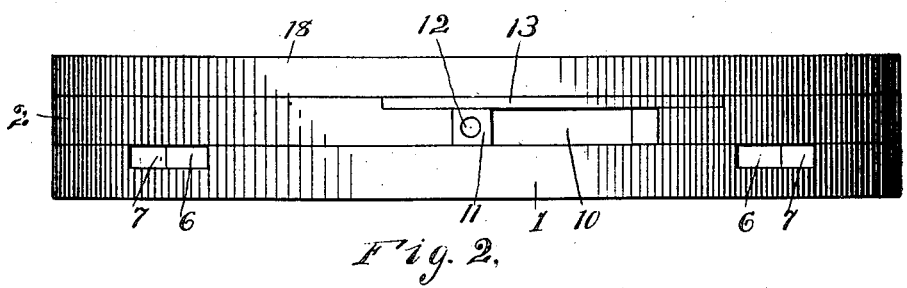

Figure 1 is a plan view of the mold having the upper plate removed and showing the interior of the mold in the closed or contracted position. Fig. 2 is an edge elevation, showing the top plate of the mold in position as closed. Fig. 3 is a plan view of the mold having the top plate removed and showing the interior as in the open or expanded position. Fig. 4 is a sectional view on line 4—4 of Fig. 3 with the top plate of the mold in position. Fig. 5 is a sectional view on dotted line 5—5 Fig. 1, also having the top plate of the mold in position.

Referring to the characters of reference. 1 represents the base plate of the mold which is circular in form and has extended from its upper face at the periphery of the mold an annular flange 2. Lying upon the upper face of the mold concentric therewith, and embraced by the flange 2, is a ring 3, said ring having formed in its inner perimeter a series of ratchet-shaped teeth or shoulders 4, the body portion of which stand eccentric to the axis of the ring, and lying within the ring 3 concentric with the mold is a divided ring composed of sections 5 having a series of teeth or shoulders 4' formed in the periphery thereof that engage and mesh with the shoulders 4 of the ring 3, as clearly shown in Fig. 3. The sections 5 are held movable in the direction of the diameter of the mold by the tongues 6 which extend outwardly from the lower surface at the center of each section, and lie in diametric ways 7 formed in the upper surface at the periphery of the base plate 1 of the mold. Said tongues extend under and lie in contact with the under surface of the ring 3 and are provided with pins 8 which extend upwardly, passing freely through guiding slots 9 that are formed through the body of the ring 3 and lie parallel with the engaging surfaces of the shoulders 4 and 4' of the rings 3 and 5, as clearly shown in Figs. 1, 3 and 4.

Extending from the periphery of the ring 3 through the apertures 10 formed in the flange 2 at opposite sides of the mold are stems 11 having apertures 12 formed in the ends thereof to permit the insertion of bars (one of which is shown by dotted lines in Fig. 1) to serve as levers for rotating said ring, said stems 11 being held from disengagement with the apertures 10 by means of the curved plates 13 which bridge said apertures and are secured to the flange 2 by means of the screws 14, as shown in Figs. 1 and 3.

The sections 5 comprising the inner ring are equal in thickness to the width of the tread surface of the casing and are concaved to conform to the arc of the tread, while the circumference of the combined sections when abutting each other is equal to the circumference of the tread of the casing. Formed in the concaved faces of the sections 5 are a series of pockets 15 of such formation as to give the desired gripping surface to the tread, and extending from said pockets horizontally through the body of the sections 5, are vent apertures 16 that communicate with recesses 17 formed in the outer faces of the shoulders 4' of said sections, as indicated by dotted lines in Fig. 1 and in cross-section in Fig. 4.

Formed in the under surfaces of the top plate 18 and the base plate 1 are annular concavities 19 which coincide with the concavities formed in the faces of the sections 5 and form the radius of the outer arc of the tire casing. The inner arc of the casing is sustained upon the ring or core 20 which lies concentric with and is confined between the base and top plates of the mold, as clearly shown in Figs. 3 and 4.

It will be seen from the description of the foregoing construction that the operation of the mold in the treatment of the casing is as follows: The parts of the mold being opened or expanded, as shown in Fig. 3, are in position to receive the work. The casing to be treated is laid upon the core 20, the tread surface of the casing being built up with a sufficient depth of rubber to receive the imprint of the engaging surfaces of the mold. The core is then placed in the mold and the top plate of the mold placed in position, as shown in Fig. 2. A bar or lever is then inserted in the aperture 12 and the ring 3 is rotated to the position shown in Fig. 1. As said ring is rotated the shoulders 4 engaging the shoulders 4' of the sections 5 act as wedges to force the sections 5 in the direction of the diameter of the mold, causing said sections to contract upon the tread of the casing, whereby the plastic surface will be forced into the apertures or pockets of the sections forming the inner ring, while the air contained within the pockets of the mold will have access to escape through the vent apertures 16 to prevent resistance to the rubber in freely entering and conforming to the walls of the pockets. The mold thus closed is placed under suitable pressure and subjected to heat treatment to set or cure the work while under pressure. The casing when cured may be readily removed from the mold by rotating the ring 3 in a reverse direction to that described, when the pins 8 engaging in the slots 9 will cause the sections 5 to be withdrawn from the tread of the casing, as shown in Fig. 3, when the work may be removed and the casing stripped off from the core.

It will be understood that various styles of raised gripping surfaces may be molded on the tread of the casing by forming in the concaved faces of the sections such shape of pocket, depression or recess as may be required to secure the desired effect of formation upon the tread of the casing.

Having thus fully set forth my invention, what I claim as new, and desire to secure by Letters Patent, is—

1. An expanding and contracting mold comprising a base plate, a rotatable ring mounted on said base plate, and having internal eccentric shoulders, a segmental ring concentric within said rotatable ring and having peripheral contact with said eccentric shoulders, a core ring concentrically within said segmental ring, a top plate for inclosing said parts, means for holding said rotatable and said segmental rings in contact and means for actuating said rotatable ring to contract said segmental ring toward said core.

2. An expanding and contracting mold comprising a circular flanged base plate, a rotatable ring concentric within the flange of said base plate, and having internal eccentric shoulders, a segmental ring also concentric with said base plate and having sliding engagement with the eccentric shoulders of said rotatable ring, a core ring concentrically within said segmental ring, a top plate for inclosing said parts, means for guiding the segments of said segmental ring in the direction of the diameter of said mold, means for retaining said segmental ring and said rotatable ring in sliding engagement and means for actuating said rotatable ring.

3. An expanding and contracting mold comprising a circular flanged base plate having diametric ways formed in the face thereof, a rotatable ring concentric with said base plate and having a series of internally projecting eccentric shoulders, a segmental ring concentric with said rotatable ring and having a series of curved eccentric shoulders formed on the periphery thereof adapted to mesh with the shoulders of said rotatable ring and having projecting tongues adapted to seat in the ways of said base plate, a core ring within said segmental ring, a top plate for inclosing said parts, and means extending through the flange of said base plate for actuating said rotatable ring.

4. An expanding and contracting mold comprising a circular flanged base plate, having diametric ways formed in the face thereof and having apertures formed through the flange thereof, a rotatable ring having a series of curved eccentric shoulders formed in the inner arc thereof and having apertured stems on the periphery thereof lying within the apertures of said flange, curved slots formed through the body of said rotatable ring parallel with the eccentric shoulders thereon, a contracting ring comprising sections having curved eccentric shoulders coinciding with the shoulders of said rotatable ring, tongues projecting from each of said sections into said diametric ways and extending under said rotatable ring, pins projecting from said tongues and passing freely through the curved slots in said rotatable ring, a core ring within the mold, plates bridging the apertures in said flange and a top plate for inclosing said parts.

In testimony whereof, I sign this specification in the presence of two witnesses.

ALEXANDER W. FINLAYSON.

Witnesses:
B. F. WHEELER,
M. E. BROESAMLE.